United States Patent
Cerrato et al.

(10) Patent No.: US 12,555,282 B2
(45) Date of Patent: Feb. 17, 2026

(54) SYSTEMS AND METHODS FOR ANTI-ALIASING

(71) Applicant: Sony Interactive Entertainment Europe Limited, London (GB)

(72) Inventors: Maurizio Cerrato, London (GB); Maria Chiara Monti, London (GB); Rosario Leonardi, London (GB); Daniele Bernabei, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 153 days.

(21) Appl. No.: 18/504,535

(22) Filed: Nov. 8, 2023

(65) Prior Publication Data

US 2024/0153176 A1 May 9, 2024

(30) Foreign Application Priority Data

Nov. 9, 2022 (GB) .................................. 2216676

(51) Int. Cl.
*G06T 11/40* (2006.01)
*G06T 7/207* (2017.01)
(Continued)

(52) U.S. Cl.
CPC .............. *G06T 11/40* (2013.01); *G06T 7/207* (2017.01); *G06T 7/254* (2017.01); *G06T 11/001* (2013.01); *G06T 2200/12* (2013.01); *G06T 2207/20016* (2013.01); *G06T 2207/20081* (2013.01); *G06T 2207/20084* (2013.01)

(58) Field of Classification Search
CPC ....... G06T 11/40; G06T 11/001; G06T 7/207; G06T 7/254; G06T 3/4053
See application file for complete search history.

(56) References Cited

U.S. PATENT DOCUMENTS 12,026,809 B2 * 7/2024 Kumar .................... G06T 11/40
2017/0186202 A1 * 6/2017 Kikuta .................... G06T 11/60
(Continued)

OTHER PUBLICATIONS

Extended Search Report issued from the European Patent Office in connection with related EP application No. 23208453.3 on Mar. 19, 2024.
(Continued)

*Primary Examiner* — Sardis F Azongha
(74) *Attorney, Agent, or Firm* — Fish & Richardson P.C.

(57) ABSTRACT

There is provided a computer-implemented method for anti-aliasing an image frame in an image stream. The method comprises providing an input to a data model, the data model being configured to perform anti-aliasing on a present frame which is displayed after a previous frame in the image stream. The input comprises: an anti-aliased image of the previous frame; an aliased image of the present frame; an ID map of the previous frame; an ID map of the present frame; and a velocity map based on changes between the previous frame and the present frame. The data model processes the received inputs to correlate image portions of the previous frame and image portions of the present frame based on the inputs and performing anti-aliasing on the present frame based at least in part on the correlated image portions. An anti-aliased image of the present frame is received as an output of the data model.

21 Claims, 5 Drawing Sheets

(51) Int. Cl.
*G06T 7/254* (2017.01)
*G06T 11/00* (2006.01)

(56) References Cited

U.S. PATENT DOCUMENTS

| | | |
|---|---|---|
| 2017/0272722 A1 | 9/2017 | Salvi et al. |
| 2021/0174473 A1 | 6/2021 | Lung et al. |
| 2022/0092738 A1 | 3/2022 | Pei et al. |
| 2023/0145496 A1* | 5/2023 | Garcés .................. G06T 3/4046 |
| | | 345/428 |

OTHER PUBLICATIONS

Search Report issued May 3, 2023, from the UK IPO in connection with related application No. GB2213376.3.

* cited by examiner

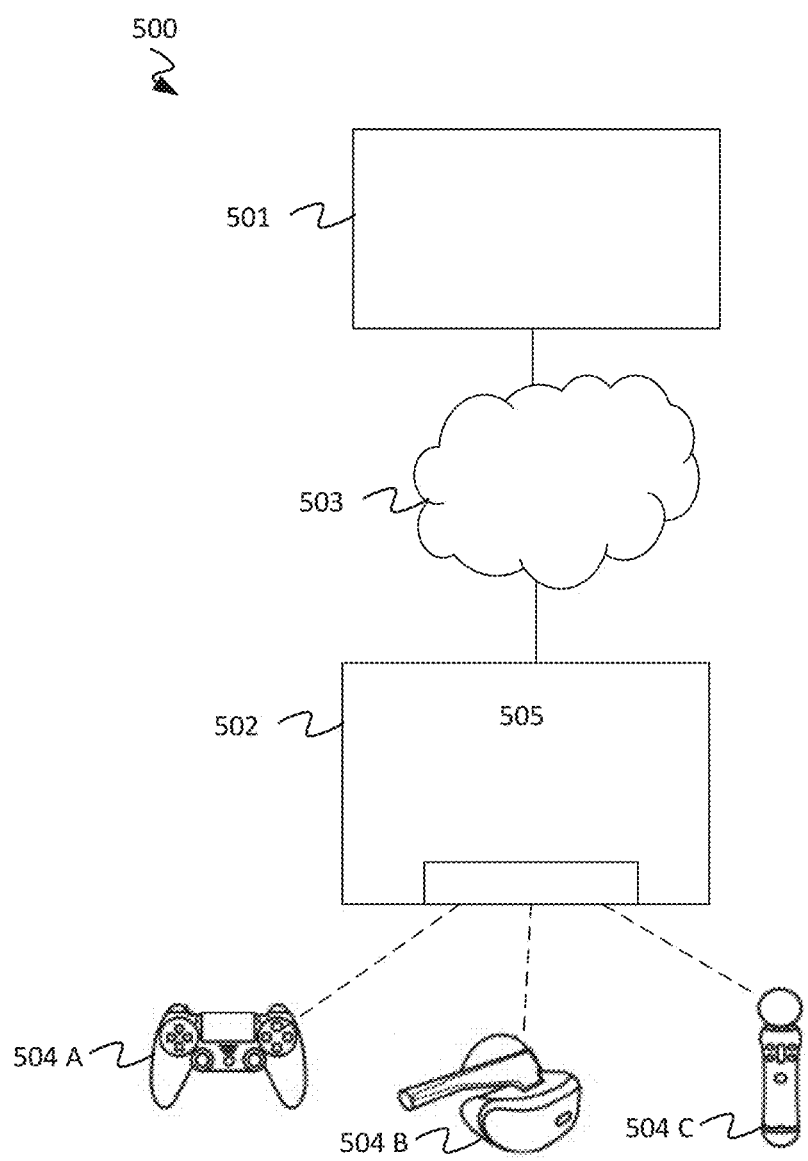

SYSTEMS AND METHODS FOR ANTI-ALIASING

CROSS-REFERENCE TO RELATED APPLICATIONS

The present application claims priority from British Patent Application No. GB2216676.3, filed Nov. 9, 2022, the contents of which are incorporated herein by reference in its entirety.

FIELD

The present disclosure relates to a method for anti-aliasing an image frame in an image stream. In particular, the present disclosure relates to a computer-implemented method for anti-aliasing an image frame in an image stream comprising providing inputs to a data model, the data model being configured to perform anti-aliasing on a present frame which is displayed after a previous frame in the image stream; processing, by the data model, the received inputs and receiving an anti-aliased image of the present frame as an output of the data model.

BACKGROUND

Aliasing occurs because a computer screen comprises an array of square pixels. These pixels all have the same size and each one displays a single colour at any one time. A line which is neither exactly horizontal nor vertical is shown as a collection of pixels, and therefore appears jagged.

Developments have been made in recent years to provide various anti-aliasing technologies to mitigate the negative effects caused by aliasing.

For example, in supersample anti-aliasing (SSAA), colour samples are taken at several instances inside the pixel (not just at the centre), and an average colour value for that pixel is calculated. SSAA stores multiple colour and depth samples per pixel, effectively rendering at a higher resolution than the one being displayed, then shrinking it to the desired size, using the extra pixels for calculation. To produce the final image, a down-sample operation is performed which is typically an averaging of all the colour samples in a pixel. The result is a down sampled image with smoother transitions from one line of pixels to another along the edges of objects. The number of samples determines the quality of the output. This improves sampling of both geometry and shading but comes with a significant increase in memory and computational requirements. SSAA is performed across the entirety of the image, even parts which may not require anti-aliasing.

Multisample anti-aliasing (MSAA) is a special case of SSAA only performing the necessary computation where it matters. It greatly reduces the amount of additional shading by making all samples of a pixel that are covered by a primitive (an image element from which a more complicated image can be constructed) have a same colour. When a same colour is assigned, it is no longer necessary to evaluate the shading function per sample, and it is evaluated only once per pixel, so only the edges of a rendered object are sampled. This removes the super-sampling of the shading function while maintaining geometry super-sampling. MSAA is typically coupled with some form of colour compression, based on the observation that if all samples covered by a single triangle have the same colour, there is no reason to store this colour more than once. This results in a significant reduction in memory bandwidth consumption of colour buffer operations.

Some specialised implementations of MSAA shade each pixel only once for each triangle that covers any of the sample positions. Because there are multiple sample positions per pixel, even non-overlapping geometry can cause different samples of the same pixel to be covered by different triangles. If there is a colour fragment for every depth fragment, the results of this additional shading are stored in memory, and later combined to produce an anti-aliased image. Although the cost is significantly lower than super sampling, there is still multiple pixel shader invocation per sample at geometry edges. With very fine geometries that are becoming more commonplace, the cost on computing resources and memory is getting close to that of SSAA.

There is therefore a desire to provide a method of anti-aliasing that provides a smooth image having a very fine geometry which is energy and cost saving.

SUMMARY

Aspects and embodiments relate to providing an image stream to be displayed at a display device. The method may be implemented by a processing resource, such as a computing device. The processing resource may be hardware and/or software implemented. The processing resource may comprise one or more processors and a memory. The processing resource may be connected to a display device.

According to a first aspect, there is provided a computer-implemented method for anti-aliasing an image frame in an image stream. The method comprises providing an input to a data model, the data model being configured to perform anti-aliasing on a present frame which is displayed after a previous frame in the image stream. The input comprises: an anti-aliased image of the previous frame; an image of the present frame; an ID map of the previous frame; an ID map of the present frame; and a velocity map based on changes between the previous frame and the present frame. The data model processes the received inputs to correlate image portions of the previous frame and image portions of the present frame based on the inputs and performing anti-aliasing on the present frame based at least in part on the correlated image portions. An anti-aliased image of the present frame is received as an output of the data model.

The image of the present frame may be a rendered image which is aliased compared to a desired anti-aliased version of the present frame. The image stream may be displayed on a display device, for example a screen, and the output of the data model may be output to said display device. The inputs are generated by the GPU in a previous computational step.

The method provides an anti-aliasing technique which has a reduced hardware footprint by virtue of training a data model, rather than relying on hardware implementations. The method can be used in images, and image streams, having fine detail such as in video gaming applications, where rendering is performed under high demand. For the data model to perform the anti-aliasing, certain inputs are required. These include an image of the present frame, which is the image to be anti-aliased. This image may be rendered external to the data model and may not be suitable to be displayed until it has been processed by the data model. An anti-aliased version of the previous frame is also input to the data model. This provides the data model with a high resolution image that may share many similarities with the present frame to be anti-aliased. An ID map locates objects and/or image portions of the image, where different objects/ image portions are each identifiable by a unique identity, for example a number. ID maps of the previous and present frames can be provided such that data model can make a comparison, e.g. finding changes and similarities between objects/image portions of the previous and present frames. A velocity map is also indicative of changes between the previous and present frames, for example identifying where objects/image portions move to/from between the frames. The data model is trained to perform anti-aliasing of the present image using these inputs. The data model may, for example, correlate image portions between the previous and present frames and performs anti-aliasing on the present frame to output an image of the present frame which has a higher resolution that the image that was input to the data model.

Typical anti-aliasing methods use features of the image itself, such as contrast, to identify areas of the image on which to perform anti-aliasing on. This can be problematic, for example resulting in false positive determination (i.e. a portion of the image which is not in the original intended image). By providing ID maps, which can be generated for each image in an image stream, the data model can determine definitively whether a portion of the image belongs to a specific object of the image or not. Furthermore, it can use this information to improve the quality of the anti-aliasing performed on the image.

In some embodiments, the step of performing anti-aliasing on the present frame may comprise processing the received inputs which are input to the data model. Processing the inputs may include the following step. A first step may include identifying a plurality of image portions, for example a first plurality of image portions, of the anti-aliased image of the previous frame based on the ID map of the previous frame. A second step may include identifying a plurality of image portions, for example a second plurality of image portions, of the image of the present frame based on the ID map of the present frame. A further step may include determining a correlation between the previous and present frames comprising determining one or more of the first plurality of image portions of the previous frame correlate with one or more of the second plurality of image portions of the present frame. Optionally, where a correlation may indicate that the image portions of the previous frame and the present frame are the same, for example having a same identity.

In some embodiments, performing anti-aliasing of the present image may be further based on a difference between the image of the present frame and the anti-aliased image of the previous frame. For example, a portion of the anti-aliased image may be useable to replace the corresponding portion of the present frame.

In some embodiments, the anti-aliased image of the previous frame may be a previous output of the data model. This can ensure that a high resolution image is available to the data model. It can be easily fed back through to the data model from the output. In other examples, it may be stored in a memory and recalled as an input.

In some embodiments, a depth map of the present frame may also be provided as an input to the data model. A depth map indicates relative positions of objects of the image, which may improve the processing of the data model.

In some embodiments, determining the one or more correlated image portions may further comprise referring to the velocity map. The velocity map is indicative of movement of objects of the image between the previous frame and the present frame, for example showing how far and in which direction objects move. With high frame rates, most changes to objects of the image are likely to be minimal, however, relative motion of the objects to one another may differ, for example depending on their depth.

In some embodiments, the image portions may be triangular.

In some embodiments, an image portion may relate to an object of the image. An example of an object of the image might be a ball (for example) or a blade of grass etc. This may be split into different image portions.

In some embodiments, one or more new image portions of the image which are not in the previous frame may have a new identity in the ID map of the present frame.

In some embodiments, an identification of an image portion may optionally comprise colour representations. The colours may be predicted by the data model and may be flat (or homogeneous) colours having no shading therein.

In some embodiments, the data model can be trained using a plurality of high resolution images. A computing device can generate the images at high resolution (for example at 4k resolution) but the rendering at the client may be much lower than this. However, these high resolution images can be used to train the data model since it is not limited by hardware or software rendering capabilities. Optionally, the plurality of high resolution images may comprise a super-sampling anti-aliased image of the present frame as ground truth. Being a convolutional image to image network, the data model consumes pixel-aligned data and outputs pixels to be displayed. It can be trained with a suitable loss function (incorporating pixel colour differences and perceptual differences) against the higher resolution ground truth. Through the training process, the network should learn to use the IDs from the current and previous frames to improve the result.

In some embodiments, the data model can be trained to detect overlapping areas of image portions in the ID map of the present frame and determine whether the image portions are correlated image portions. Optionally, the data model may perform a resolution of the present frame at the overlapping area of the image portions. Optionally, the resolution comprises performing super sampling/super resolution at the overlapping area. Overlapping portions may be portions of the present image frame to which anti-aliasing techniques can be applied, for example by the data model. Portions of the image which are not overlapping may or may not have supersampling applied. Selecting which areas to be processed according to an anti-aliasing technique may reduce processing required compared to techniques that process the entire image. The ID map may inform the correlation of resolution performed at the previous frame, for example using motion vectors to match the present frame.

In some embodiments, the data model may comprise an artificial neural network (ANN). Optionally, the ANN comprises a convolutional neural network (CNN).

In some embodiments, the CNN may comprise skip connections, wherein a skip connection skips one or more layers of the CNN and feeds the output of one layer as input to the next layers. This type of CNN may be easier to train because it alleviates a known "vanishing gradient" problem.

In some embodiments, the CNN may be a shallow convolutional network. Optionally, the shallow convolutional network is an encoder-decoder network. A CNN is an encoder-decoder network if it is hourglass shaped, with layers in the first half (the encoder) reducing the spatial dimension and increasing the channel dimension. At the bottleneck the network reduces the spatial dimension of the image to a tensor of just one pixel containing a large number of channels. The second half of the network (the decoder)

expands back the one-pixel tensor into a full-size image with the desired number of output channels (for example three). Skip connections bridge layers in the encoder to symmetrical layers in the decoder According to a second aspect, there is provided a system comprising one or more processors configured to implement the method of the first aspect.

According to a third aspect, there is provided a non-transitory machine-readable medium having stored thereon a set of instructions, which if performed by one or more processors, cause the one or more processors to implement the method of the first aspect.

BRIEF DESCRIPTION OF DRAWINGS

A more complete understanding of the subject matter may be derived by referring to the detailed description and claims when considered in conjunction with the following figures, wherein like reference numbers refer to similar elements throughout the figures.

FIG. 5 shows schematically an example of a cloud gaming system that may be used in accordance with the present disclosure.

DETAILED DESCRIPTION

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations.

Furthermore, there is no intention to be bound by any expressed or implied theory presented in the preceding technical field, background, or the following detailed description.

An image, in particular a two-dimensional (2D) image, comprises a number of objects. In rendering, it can be difficult to achieve a high resolution image on a display device which exactly represents a simulated image, where a simulated image is a synthetic image that is computer generated. This is largely due to hardware effects such as pixel structure and other rendering limitations. One of the effects that can happen to an image through the rendering is that lines that are not exactly horizontal or vertical (i.e. that follow the grid structure of the pixel array of a screen through which the image is displayed) appear blurred or jagged. The present disclosure provides a method for reducing these artefacts in the image displayed at the screen.

Figure 1:
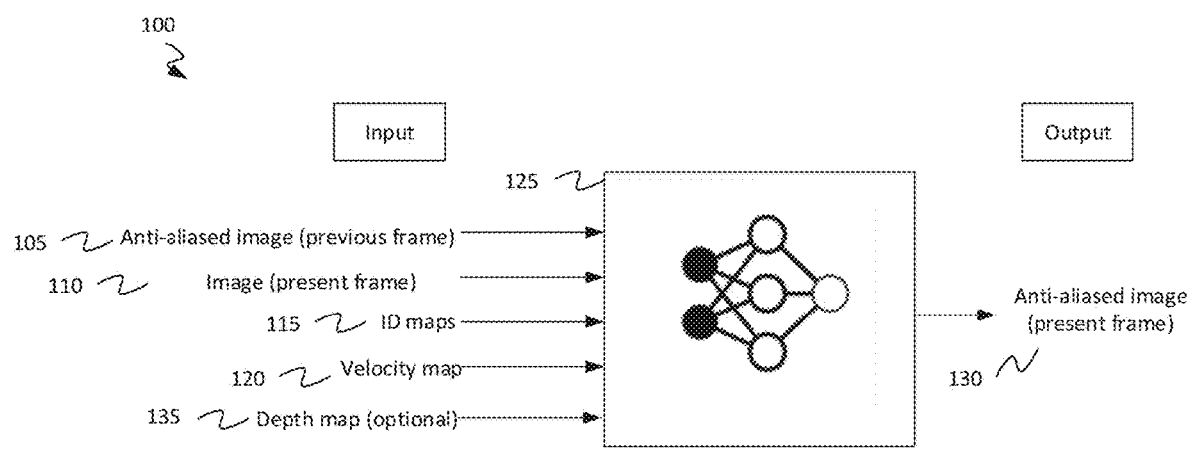
FIG. 1 illustrates inputs and outputs of a data model configured to carry out a method of anti-aliasing an image according to an embodiment of the present disclosure.

FIG. 1 illustrates inputs and outputs of a data model 125 configured to carry out a method 100 of anti-aliasing an image according to an embodiment of the present disclosure.

Inputs to the data model 125 include:
an anti-aliased image of a previous frame of the image stream, 105
an image of a present frame of the image stream (which is aliased and which is to be anti-aliased according to the described method), 110
identity (ID) maps of the previous and present frames, 115
a velocity map, 120
optionally, a depth map 135.

The anti-aliased image of the previous frame 105 is in one example an output of the data model 125 from a previous iteration of the method 100. It can be used to inform the data model 125 about portions of the present frame 110 which are identified as needing to be anti-aliased by the data model 125. The anti-aliased image of the previous frame 105 may be retrieved from a memory, or a copy may be sent directly to the input from the output of a previous iteration of the method.

The image of the present frame 110 is the image frame that the data model 125 is trained to perform the method 100 on. The image frame received by the data model 125 is a rendered image which has a number of portions of the image which require aliasing to improve the quality of the image. The image of the present frame 110 is rendered to a first approximation, for example by hardware or software of a client device or server device, having a resolution which is lower than desired for display. The resolution of the image of the present frame 110 may be limited by the hardware and/or software that renders it.

An identity (ID) map individually identifies image portions of the images of the previous and present frames 105, 110. The images 105, 110 may comprise any number of image portions, largely depending on the complexity of the image to be displayed. The size and shape of these image portions may also vary widely both within one image and between images in the image stream. In some examples, an object can be represented by a single image portion, whilst in other examples an object may comprise a number of image portions, each having their own IDs. Image portions may be triangular in shape. With very fine geometries, some of the triangles may be very small. An ID map can be generated by an ID buffer, which is part of a GPU rendering process. The ID buffer may store object and triangle IDs.

Using ID maps that identify image portions of the image can improve the final image to be output compared to other techniques because it reduces the chances of anti-aliasing techniques creating false positives caused by techniques that evaluate changes in contrast in the image. A false positive can be defined as an artefact of the image that results from the anti-aliasing techniques which are applied, for example when averaging techniques are applied to changes is contrast at the pixel. By both defining and identifying the image into smaller image portions with individual IDs, there is no need to rely on a difference in contrast to determine where the image portions are. As such, the data model 125 can determine definitively where an image portion is.

Objects and/or image portions of the image which are present in both the previous and present frames can be tracked, for example by the data model 125, by their IDs. More generally, image portions which are the present in both the previous and present frames 105, 110 maintain the same identities such that the data model 125 can identify them as relating to the same object/image portion. In some cases, the objects/image portions may be stationary between frames (for example relating to objects of the image which are in a background of the image), whilst other objects/image portions may move between frames (for example relating to moving characters or suchlike in a foreground of the image). Identifying the image portions effectively creates a catalogue of the image to be displayed.

An ID map of both the previous frame and the present frame being supplied to the data model 125 allows for the image portions to be compared and contrasted. Correlating an ID from the previous frame with an ID of the present frame can be performed. The data model 125 can determine that image portions having the same ID in the present and previous frame relate to the same image portion.

A velocity map 120 provides yet further information to the data model 125. It identifies a velocity (i.e. a vector quantity indicating speed and direction) of objects of the present frame relative to the previous frame, for example indicating changes between the two frames. For example, an object in the background of the image (e.g. a tree) which does not move between the previous and present frame may have a velocity of 0 pixels/frame. However, a character which jumps and therefore moves between the frames has a speed which is greater than zero, and a direction of the jump (up, down, left, right). This information can be provided to the data model 125 as a velocity map. The velocity map can indicate the velocity of every object of the image (including those which do not move), however, in some cases it may relate only to moving objects between the image frames.

Optionally, a depth map may also be provided to the data model 125. The depth map indicates where the objects are positioned within the image (e.g. background, midground, or foreground). It may also indicate a relative position of an object in relation to another object, for example indicating which objects are in front or behind others in the image. This information may further help the data model 125 to identify different objects within the image.

In some examples, the data model may be provided with input data from a plurality of previous frames, comprising anti-aliased images, ID maps and/or velocity maps of the image stream.

A data model 125 processes the various inputs and outputs an anti-aliased image 130 of the present frame. The data model 125 will be described in more detail below.

An anti-aliased version of the present image 130 is output from the data model 125. In some examples, this may be fed straight back into the data model to perform anti-aliasing on the next image frame of the sequence of image frames in the image stream. This process may be repeated on a continuous loop whilst the image stream is being provided as input to the data model 125 and being displayed on a screen.

Output images 130 may be stored, for example in a memory. They may be stored temporarily, for example until a next few frames of the image stream have been output, or may be stored more permanently in a repository. The rendered and anti-aliased images output from the data model 125 may be helped to train the data model for this and/or other purposes.

By using a machine-learning algorithm having inputs comprising an anti-aliased version of a previous image frame 105 in an image stream, an aliased image of the present frame 110, an ID map of the previous and present frames 115, along with a velocity map 120 which indicates movement of the IDs between the frames, information is provided to the data model 125, which is a machine learning algorithm, that results in an output comprising an anti-aliased present frame 130. Importantly, the method is not contrast based, instead using ID maps to determine objects of the image.

Compared to other known techniques, the method described herein does not have an extra memory footprint or use extra pixel shading invocations to achieve anti-aliasing. This makes the performance, and the final image to be displayed, more predictable as it does not depend on the represented scene, for example using differences in contrast to perform the anti-aliasing techniques.

Data Model

The data model is a machine learning algorithm, such as an ANN or a CNN. ANNs (including CNNs) are computational models inspired by biological neural networks and are used to approximate functions that are generally unknown. ANNs can be hardware (neurons are represented by physical components) or software-based (computer models) and can use a variety of topologies and learning algorithms. ANNs can be configured to approximate and derive functions without a prior knowledge of a task that is to be performed and instead, they evolve their own set of relevant characteristics from learning material that they process. A convolutional neural network (CNN) employs the mathematical operation of convolution in at least one of their layers and are widely used for image mapping and classification applications. CNNs can be hardware or software based and can also use a variety of topologies and learning algorithms. A CNN usually comprises at least one convolutional layer where a feature map is generated by the application of a kernel matrix to an input image. This is followed by at least one pooling layer and a fully connected layer, which deploys a multilayer perceptron which comprises at least an input layer, at least one hidden layer and an output layer. The at least one hidden layer applies weights to the output of the pooling layer to determine an output prediction.

In some examples, ANNs usually have three layers that are interconnected. The first layer may consist of input neurons. These input neurons send data on to the second layer, referred to a hidden layer which implements a function and which in turn sends output neurons to the third layer. With respect to the number of neurons in the input layer, this may be based on training data, for example high resolution and low resolution versions of the same images, to train the ANN for detecting similar traits (including areas that require anti-aliasing) and modifying the image accordingly to improve the image quality.

The second or hidden layer in a neural network implements one or more functions. There may be a plurality of hidden layers in the ANN. For example, the function or functions may each compute a linear transformation of the previous layer or compute logical functions. For instance, considering that an input vector can be represented as x, the hidden layer functions as h and the output as y, then the ANN may be understood as implementing a function of using the second or hidden layer that maps from x to h and another function g that maps from h to y. So, the hidden layer's activation is f(x) and the output of the network is g(f(x)).

In some examples, in order to train the ANN to detect a characteristic associated with a feature of interest pertaining to an image portion which requires anti-aliasing to be applied, such as a jagged line etc, the following information may need to be provided to the data model:

(i) a plurality of high resolution training images, each training image having one or more traits of a certain type;

(ii) a suitable loss function (incorporating pixel colour differences and perceptual differences) against the higher resolution ground truth.

Through the training process, the network should be able to learn to use the input to the data model 125 improve the result of the present frame image which is output and anti-aliased.

The data model 125 may be trained using images which are computer generated, and which are rendered through traditional techniques. The training may be implemented using feedforward and backpropagation techniques.

The data model 125 according to the present disclosure may consist of a shallow convolutional encoder-decoder network with skip connections. It may comprise a convolutional network (CNN) having a plurality of layers n=1 to N layers, where n>3. Skip connections skip some of the layers in the neural network and feed the output of one layer as the input to one or more next layers. The main input to the network is the present image frame to be resolved and the main output is the resolved image (which may be a prediction). Skip connection is a standard module in a number of known convolutional architectures. By using a skip connection an alternative path for the gradient with back propagation is provided. The idea of back propagation is to gradually minimise the loss function by updating the parameters of the network. Additional paths may be beneficial for model convergence. Long skip connections often exists in encoder-decoder architectures. By introducing skip connections in these encoder-decoder architectures, fine grained details can be recovered in the prediction. This is what makes it particularly beneficial for the application of anti-aliasing. Other advantages include the output being significantly sharper than other techniques. it is also easier to train because it alleviates the "vanishing gradient" problem.

The data model 125 can be trained using a plurality of simulated images as ground truth. A ground truth provides a kind of supervision to compare the networks prediction to the desired outcome, the desired outcome being the ground truth. A loss function of the data model 125 of the present disclosure penalises changing the image outside of the transition zones (i.e. areas of the image which do not need to have anti-aliasing techniques applied). The loss function can be used to describe how good the model is in terms of an expected outcome.

The data model processes the received inputs to correlate image portions of the previous frame and image portions of the present frame based on the inputs and performing anti-aliasing on the present frame based at least in part on the correlated image portions. The correlation provides contextual information about the image to the data model 125, to identify portions of the image.

In some examples, performing anti-aliasing on the present frame comprises the data model 125 processing the received inputs of the anti-aliased previous image 105, the present image 110, the ID maps 115, the velocity map 120, and optionally a depth map, by the steps of:

identifying a plurality of image portions of the anti-aliased image of the previous frame based on the ID map of the previous frame;

identifying a plurality of image portions of the 'aliased' image of the present frame based on the ID map of the present frame;

determining a correlation between the identities of image portions of the previous and present frames.

Image portions of the ID map that are present in both of the previous and present frames will be have a same identity. This allows the data model 125 to determine similarities between consecutive image frames, by tracking the IDs of image portions. Determining a correlation may comprise determining one or more image portions of the present frame that have a same identity as an image portion of the previous frame. For example, the correlation may be based on identities of image portions of the ID map of the present frame that correlate with one or more identities of image portions of the previous frame based on the ID map of the previous frame. Further to determining that a correlation exists, the data model may perform anti-aliasing of the present frame 110 based on a difference between the aliased image of the present frame and the anti-aliased image of the previous frame. For example, the data model 125 can determine where the corresponding location of the matching image portions are in the previous frame and the present frame, using the ID maps and the velocity map (and/or the depth map) for reference.

In some examples, anti-aliasing techniques, for example super sampling, can be applied to the entire image of the present frame. This can be applied by the data model 125. In other examples, areas of the image which are to be processed for anti-aliasing may be determined by detecting overlapping areas of image portions within the present image frame. Observing overlap of the image portions may include observing transition areas from one ID to the next in the ID map of the present frame. The machine learning algorithm is configured to apply anti-aliasing techniques to the detected areas as described herein.

Figure 2A:
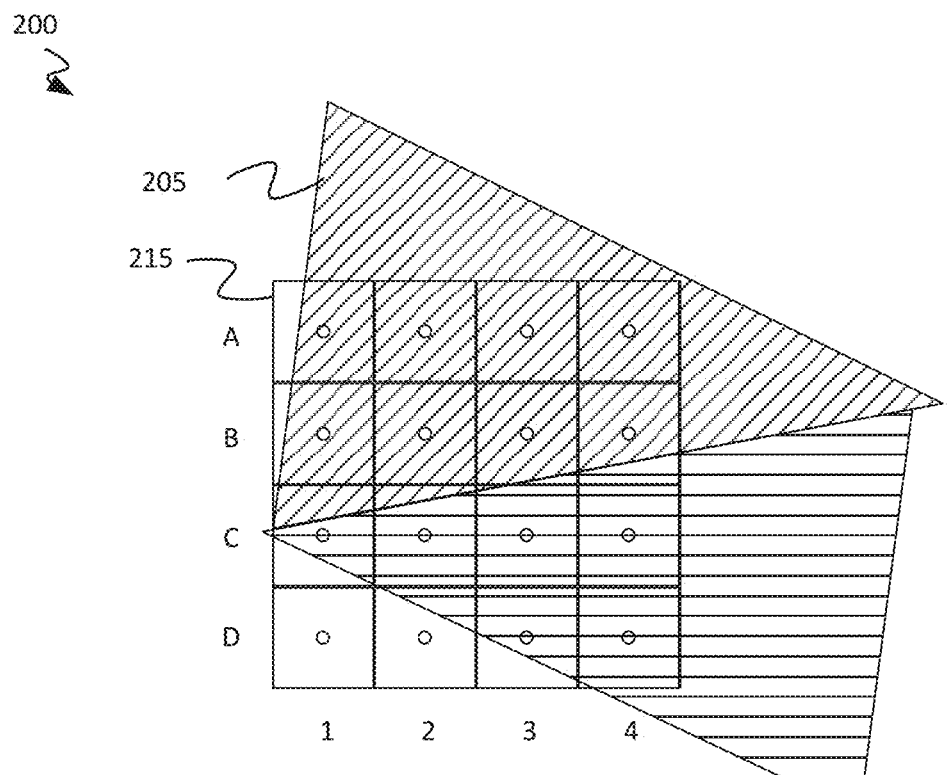
FIGS. 2A and 2B illustrate a portion of an ID map according to an embodiment of the present disclosure.
Figure 2B:
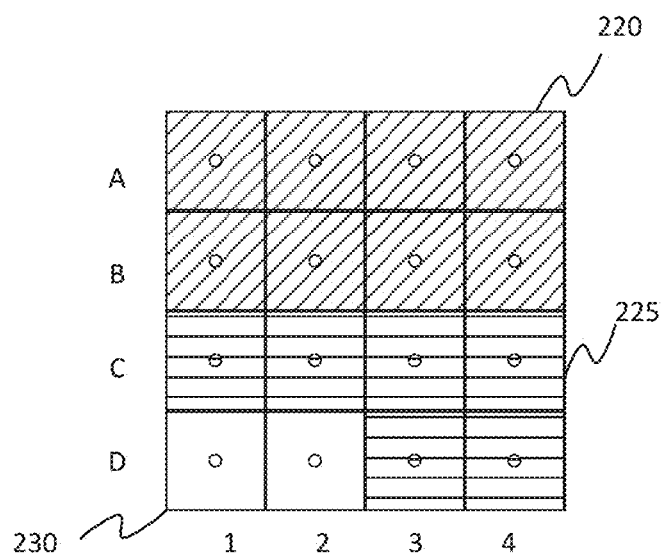

FIGS. 2A and 2B illustrate a portion of an ID map according to an embodiment of the present disclosure. FIG. 2A illustrates a first triangle ID 205 and a second triangle ID 210 over a 4×4 pixel array 215 having pixels A1 to D4. It will be acknowledged that this is an example only, for the purposes of illustration.

The first triangle ID 205 has a first colour representation and at least in part covers pixels A1 to A4, B1 to B4 and C1 to C2. Pixels A2 to A4 and B2 are all covered entirely by the first triangle ID 205 having the first colour representation. Pixels A1, B1, B3 and B4 are all covered by the first colour at the centre of the pixel (the centre of the pixel being indicated in FIG. 2A by the central circle). Pixel C1 is covered partially by the first triangle ID 205, but the first triangle ID 205 does not cover the centre of the pixel.

The second triangle ID 210 has a second colour representation and at least in part covers pixels B4, C1 to C4 and D2 to D4. Pixel C4 is covered entirely by the second triangle ID 210. Pixels C1, C2, D3 and D4 are covered at their centre by the second triangle ID 210. Pixels B4 and D2 are covered partially by the second triangle ID 210, but the second triangle ID 210 does not cover the centre of these pixels.

Pixel D1 is not covered by either of the first or second triangle IDs 205, 210. Pixel D2 is covered partially by the second triangle ID 210, however, the centre is not covered by the second triangle ID 210.

FIG. 2B illustrates a first pass of the method, where a pixel is assigned a colour based on a colour of the triangle ID that passes through the centre of it. Accordingly, A1 to B4 are awarded the first colour representation, pixels C1 to C4, D3 and D4 are awarded the second colour, and pixels D1 and D2 remain uncoloured. The example pixel array displayed in FIG. 2B may represent an image of the present which has been rendered, and which forms an input to the data model 125.

In one example, the inputs to the data model 125 may include an ID map comprising the triangle IDs 205, 210 as illustrated in FIG. 2A and the corresponding image of the pixel array illustrated in FIG. 2B.

Transition zones can be detected from this colour assignment process. A transition zone may be determined as a place at which the colour changes from one pixel to the next, i.e. between neighbouring pixels.

In another example, the data model 125 may be configured to detect these transition zones and apply anti-aliasing only in the transition areas. In FIG. 2B, a transition happens between the B and C rows of the grid 230, where the colour changes from a first colour 220 to a second colour 225. A further transition zone occurs between the boundaries of C1 and D1; C2 and D2; and D2 and D3. These areas may be identified by the data model 125 as requiring anti-aliasing. A technique such as supersampling may be used by the data model to perform the anti-aliasing at the transition zones.

Figure 3A:
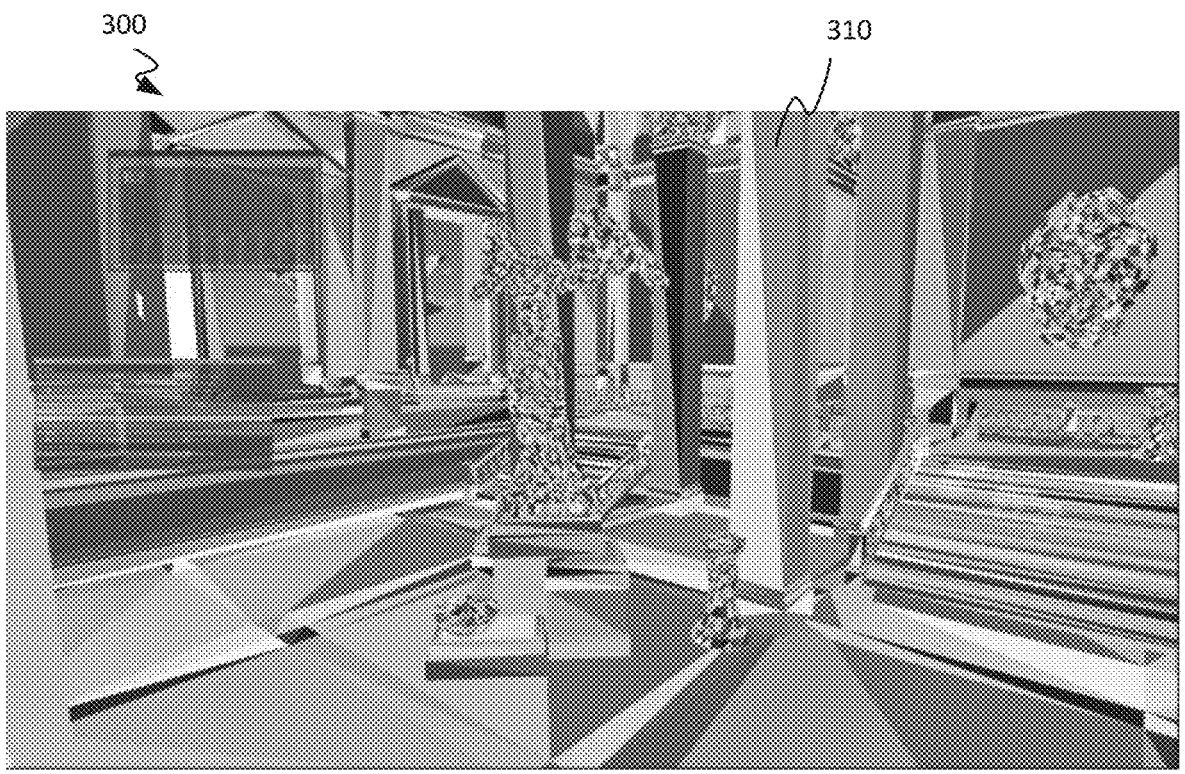
FIG. 3A illustrates an ID map of an image according to an embodiment of the present disclosure.

FIG. 3A illustrates an ID map 300 of an image according to an embodiment of the present disclosure. An ID buffer generates this map during a rendering process, the map comprising a plurality of triangle IDs 310, each having a different colour to its neighbours. As can be seen, some of the triangles 310 are very small, whilst others are much larger. The size of the triangle 310 may be small where a texture of an object is particularly complex, for example.

In some examples, the image portions of the ID map 300 are triangular, such as those illustrated in FIG. 3A. Triangular portions are particularly important when considering anti-aliasing because edges which are not exactly perpendicular or horizontal may be subject to aliasing; a triangle will always have at least one edge which will not align with a vertical or horizontal line. Each triangle 310 that contributes to the ID map 300 is assigned an identity. In some examples, an identity is an identification number.

In some examples, the ID map 300 comprises an image where each image portion comprises a colour, for example a flat/homogenous colour which is a colour without any shading or visual changes within the image portion. By assigning colours to the image portions, overlapping areas can be easily identified. The overlapping areas may relate to areas of the image that need resolving, for example using anti-aliasing techniques.

Figure 3B:
FIG. 3B illustrates an image relating to the ID map of FIG. 3A according to an embodiment of the present disclosure.

FIG. 3B illustrates an image 350 relating to the ID map of FIG. 3A according to an embodiment of the present disclosure. The image is an example of an image created by an ID buffer and a relative colour buffer. As will be appreciated, the triangle IDs of the image are not themselves visible in the image of FIG. 3B once the colour has been added to the image 350. From this image, it may be appreciated that basing anti-aliasing techniques on the image alone (e.g. based on contrast) can be challenging.

Figure 4:
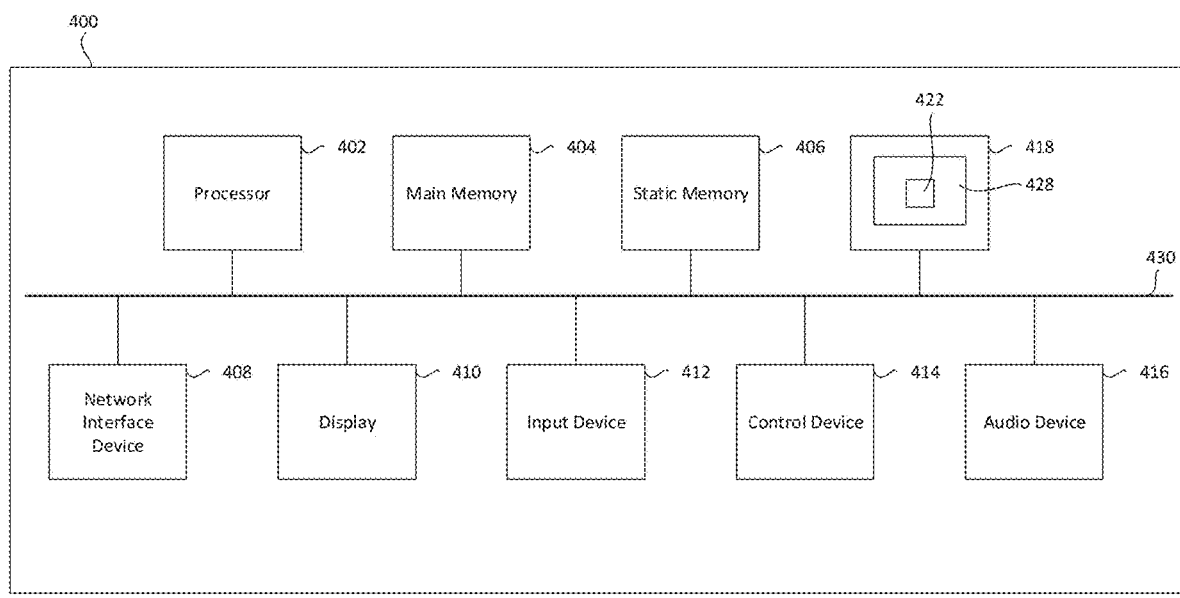
FIG. 4 illustrates a block diagram of one example implementation of a computing device that can be used for implementing the steps indicated in FIG. 1 and explained throughout the detailed description.

FIG. 4 illustrates a block diagram of one example implementation of a computing device 400 that can be used for implementing the steps indicated in FIG. 1 and explained throughout the detailed description. The computing device is associated with executable instructions for causing the computing device to perform any one or more of the methodologies discussed herein. The computing device 400 may operate in the capacity of the data model or one or more computing resources for implementing the data model for carrying out the methods of the present disclosure. In alternative implementations, the computing device 400 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 400 includes a processing device 402, a main memory 404 (e.g., read-only memory (ROM), flash memory, dynamic random-access memory (DRAM) such as synchronous DRAM (SDRAM) or Rambus DRAM (RDRAM), etc.), a static memory 406 (e.g., flash memory, static random-access memory (SRAM), etc.), and a secondary memory (e.g., a data storage device 418), which communicate with each other via a bus 430.

Processing device 402 represents one or more general-purpose processors such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic (instructions 422) for performing the operations and steps discussed herein.

The computing device 400 may further include a network interface device 408. The computing device 400 also may include a video display unit 410 (e.g., a liquid crystal display (LCD) or a cathode ray tube (CRT)), an alphanumeric input device 412 (e.g., a keyboard or touchscreen), a cursor control device 414 (e.g., a mouse or touchscreen), and an audio device 416 (e.g., a speaker).

The data storage device 418 may include one or more machine-readable storage media (or more specifically one or more non-transitory computer-readable storage media) 428 on which is stored one or more sets of instructions 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "providing", "calculating", "computing," "identifying", "detecting", "establishing", "training", "determining", "storing", "generating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 5 shows schematically an example of a cloud gaming system 500 that may be used in accordance with the present disclosure. In FIG. 5, the cloud gaming system 500 is shown as comprising a server 501 that is in communication with a client device 502 via a communications network 503. The server 501 may be configured to perform at least some of the method described above.

The client device 502 may include, e.g. a video game playing device (games console), a smart TV, a set-top box, a smartphone, laptop, personal computer (PC), USB-streaming device (e.g. Chromecast), etc. The client device 502 may receive e.g. video frames from the server 501, via the communications network 503. In some examples, the client device 501 may receive image data from the server 501 and perform further processing on that image data.

In FIG. 5, the client device 502 is shown as being associated with a plurality of input devices 504A (DualShock 4®), 504B (PS VR® headset), 504C (PS Move® Controller). It will be appreciated that the input devices 504A, 504B, 504C shown are merely illustrative examples and that a different number of, and/or different types of input devices may be provided. The input devices are in communication with the client device via a wired or wireless connection. In FIG. 5, the client device 502 is shown as comprising a communication interface 505 for receiving user inputs generated at or via the input devices. It will be further appreciated that in some examples, user inputs may be generated at the client device 502 and not necessarily with a separate, standalone input device. For example, if the client device 502 is e.g. a smartphone or table with a touchscreen.

The invention claimed is:

1. A computer-implemented method for anti-aliasing an image frame in an image stream comprising:
   providing an input to a data model, the data model being configured to perform anti-aliasing on a present frame which is displayed after a previous frame in the image stream, the input comprising
      an anti-aliased image of the previous frame,
      an image of the present frame having a lower resolution than the anti-aliased image of the previous frame,
      an ID map of the previous frame,
      an ID map of the present frame, and
      a velocity map based on changes between the previous frame and the present frame;
   processing, by the data model, the received input to correlate image portions of the previous frame and image portions of the present frame based on the input;
   performing, by the data model, anti-aliasing on the image of the present frame based at least in part on the correlated image portions; and
   outputting, by the data model an anti-aliased image of the present frame.

2. The computer-implemented method of claim 1, wherein processing the received input comprises:
   identifying a first plurality of image portions of the anti-aliased image of the previous frame based on the ID map of the previous frame;
   identifying a second plurality of image portions of the image of the present frame based on the received ID map of the present frame;
   wherein determining the correlation between the previous and present frames comprises determining one or more of the first plurality of image portions that correlate with one or more of the second plurality of image portions.

3. The computer-implemented method of claim 2, wherein the correlation indicates that the image portions of the previous frame and the present frame are the same.

4. The computer implemented method of claim 1, wherein performing the anti-aliasing of the present image is further based on a difference between the image of the present frame and the anti-aliased image of the previous frame.

5. The computer-implemented method of claim 1, further comprising providing a depth map of the present frame as an input to the data model.

6. The computer-implemented method of claim 1, wherein the image portions are triangular.

7. The computer-implemented method of claim 1, wherein an image portion relates to an object of the image.

8. The computer-implemented method of claim 1, wherein one or more new image portions of the image which are not in the previous frame have a new identity in the ID map of the present frame.

9. The computer-implemented method of claim 1, wherein an identification of an image portion comprises colour representations.

10. The computer-implemented method of claim 1, wherein the data model is trained using a plurality of high resolution images.

11. The computer-implemented method of claim 10, wherein the plurality of high resolution images comprise a super-sampling anti-aliased image of the present frame as ground truth.

12. The computer-implemented method of claim 1, wherein the data model is trained to detect overlapping areas of image portions in the ID map of the present frame and determine whether the image portions are correlated image portions.

13. The computer-implemented method of claim 12, wherein the data model performs a resolution of the present frame at the overlapping area.

14. The computer-implemented method of claim 13, wherein the resolution comprises performing super sampling at the overlapping area.

15. The computer-implemented method of claim 1, wherein the data model comprises an artificial neural network (ANN), wherein the ANN comprises a convolutional neural network (CNN).

16. The computer-implemented method of claim 15, wherein the CNN comprises skip connections, wherein a skip connection skips one or more layers of the CNN and feeds the output of one layer as input to the next layers.

17. The computer-implemented method of claim 16, wherein the CNN is a shallow convolutional network, wherein the shallow convolutional network is an encoder-decoder network.

18. The computer-implemented method of claim 1, further comprising:
using the anti-aliased image of the present frame as the anti-aliased image of the previous frame in the input for anti-aliasing a subsequent frame in the image stream.

19. The computer-implemented method of claim 18, further comprising:
detecting an initialization condition; and
in response to detecting the initialization condition, substituting the anti-aliased image of the previous frame, which was generated by the data model, with an anti-aliased image generated independently of the data model.

20. A system comprising one or more processors configured to implement a method for anti-aliasing an image frame in an image stream comprising:
providing an input to a data model, the data model being configured to perform antialiasing on a present frame which is displayed after a previous frame in the image stream,
the input comprising
an anti-aliased image of the previous frame,
an image of the present frame having a lower resolution than the anti-aliased image of the previous frame,
an ID map of the previous frame,
an ID map of the present frame, and
a velocity map based on changes between the previous frame and the present frame;
processing, by the data model, the received input to correlate image portions of the previous frame and image portions of the present frame based on the input;
performing, by the data model, anti-aliasing on the image of the present frame based at least in part on the correlated image portions; and
outputting, by the data model, an anti-aliased image of the present frame.

21. A non-transitory machine-readable medium having stored thereon a set of instructions, which if performed by one or more processors, cause the one or more processors to implement a method for anti-aliasing an image frame in an image stream comprising:
providing an input to a data model, the data model being configured to perform anti-aliasing on a present frame which is displayed after a previous frame in the image stream,
the input comprising
an anti-aliased image of the previous frame,
an image of the present frame having a lower resolution than the anti-aliased image of the previous frame,
an ID map of the previous frame,
an ID map of the present frame, and
a velocity map based on changes between the previous frame and the present frame;
processing, by the data model, the received input to correlate image portions of the previous frame and image portions of the present frame based on the input:
performing, by the data model, anti-aliasing on the image of the present frame based at least in part on the correlated image portions; and
outputting, by the data model, an anti-aliased image of the present frame.

* * * * *